Patented Jan. 18, 1949

2,459,773

UNITED STATES PATENT OFFICE

2,459,773

PHTHALOCYANINE POLYHYDROXYALKYL-SULFONAMIDES

Raymond Lemuel Mayhew, Phillipsburg, N. J., assignor to General Aniline & Film Corporation, New York, N. Y., a corporation of Delaware No Drawing. Application July 11, 1945, Serial No. 604,512

3 Claims. (Cl. 260—314.5)

The present invention relates to new compounds of the phthalocyanine series and to a method of preparing the same.

The phthalocyanines constitute a valuable class of colors which, while soluble in concentrated sulfuric and phosphoric acids and in certain other acids from which they are precipitated on dilution with water, are highly insoluble in water, aqueous ammonia, or aqueous caustic alkali.

The term phthalocyanine is used herein in the generic sense to define tetraazaporphins in which each of the four pyrrole nuclei is fused to an aromatic nucleus, e. g., phenyl, biphenyl, naphthyl, anthranyl, etc., of which phthalocyanine itself (tetrabenzotetraazaphorphin) is a well-known example. The phthalocyanine molecule may be metal free or contain a metal in complex combination, for example, copper, cobalt, nickel, iron, aluminum, etc.

The present invention has as an object improvements in the solubility of compounds of the phthalocyanine series in respect to water, aqueous ammonia or aqueous caustic alkali, thereby to enlarge the field of application of these colors. A further object is the provision of new phthalocyanine sulfonamides. A still further object is the provision of a process for the manufacture of the new phthalocyanine sulfonamides. Other objects of the invention will appear as the description proceeds.

I have found that the above objects may be accomplished by reacting a phthalocyanine sulfonylchloride with a polyhydroxy primary alkylamine. The reaction may be carried out in water or in other suitable medium at elevated temperatures, preferably, however, at room or even lower temperatures.

The new compounds are phthalocyanines containing attached to the arylene nuclei at least one polyhydroxyalkylsulfonamide group. The number of these sulfonamide groups may vary from one to four or more depending on the number of sulfonylchloride groups present on the arylene nuclei of the starting phthalocyanine. In some instances, the products may contain attached to the arylene nuclei, in addition to the sulfonamide group or groups, one or more sulfonic acid groups, either free or in the form of the amine salt, or other substituents, such as halogen atoms, e. g., chlorine, or amino or carboxy groups, etc. By varying the number of the polyhydroxyalkyl sulfonamide groups on the arylene nuclei of the phthalocyanine and by proper selection of the ratio of hydroxy groups to the length (singly or in the aggregate) of the alkyl chain or chains of the sulfonamide group, the higher this ratio, the greater the solubilizing effect of the sulfonamide group, phthalocyanine sulfonamides may be obtained which are soluble in dilute aqueous caustic alkali, e. g., sodium, potassium or lithium hydroxides, and, in addition, may also be soluble in aqueous ammonia or in water, in that order, or in all three of these aqueous media.

Among the polyhydroxy primary alkylamines which may be employed for the production of the new phthalocyanine sulfonamides are, for example, 2-amino-2-methyl-1,3-propanediol [1,1 - bis-(hydroxymethyl)-1-aminoethane], 2 - amino - 2-ethyl-1,3-propanediol [1,1 - bis(hydroxymethyl) - 1 - aminopropane], tris(hydroxymethyl) aminomethane, glucosamine (2-aminoglucose), 1-aminoglucose, 1-methyl-amino-2,3 - propanediol, 1-ethyl-amino-2,3-propanediol, etc. A preferred class of amines are the aminopolyhydroxy alcohols which may be prepared by the condensation of nitroparaffins with aldehydes followed by reduction of the nitro group, for example, the aforementioned 2-amino-2-methyl-1,3-propanediol, $$NH_2CH_3C(CH_2OH)_2$$

and tris(hydroxymethyl) aminomethane, $$NH_2C(CH_2OH)_3$$

These amines all yield valuable water-soluble dyestuffs.

The new phthalocyanine dyestuffs are characterized by their brilliant blue to greenish-blue shades, their solubility and stability in caustic alkali solution and their relatively good fastness to light. They are capable of dyeing various fibers, such as cotton, wool and silk, showing particularly good affinity for silk. Where sulfonic acid groups, either free or in the form of the amine salt, are also present on the arylene nuclei, the phthalocyanine sulfonamides are capable of being converted into color lakes which, for example, calcium or barium salts. The dyestuffs furthermore, are eminently suited for the preparation of writing inks, being employed for this purpose in water solution or in the form of their soluble salts, particularly the sodium, potassium, ammonium and lithium salts. Because of their stability in dilute aqueous caustic alkali solution, they are particularly suited as colors in writing inks rendered quick drying by the use of caustic alkali. As colors in such quick-drying inks, they are quite resistant to leaching by water and are furthermore characterized by their light fastness and outstanding brightness.

The starting phthalocyanine sulfonylchlorides employed in the preparation of the phthalocyanine sulfonamides may be obtained by reacting chlorosulfonic acid with the corresponding phthalocyanines at an elevated temperature as described in U. S. P. 2,219,330. They may also be made from the corresponding phthalocyanine sulfonic acids or their salts by treatment with phosphorus pentachloride.

The invention is further illustrated by the following specific examples to which, however, it is not intended that it be limited. Parts are by weight unless otherwise noted.

Example 1

Ten parts of copper phthalocyanine tetrasulfonylchloride in the form of a dry powder is added with stirring to 50 parts of water in which has been dissolved 10 parts of tris(hydroxymethyl)aminomethane. Stirring is continued for several hours at room temperature until dissolution is complete. The resulting solution is then poured into 200 volumes of 10% hydrochloric acid to precipitate the dyestuff which is filtered off and dried. The bright blue powder obtained dyes cotton, wool and silk a vivid greenish-blue shade. It is soluble in water, aqueous ammonia and in dilute aqueous caustic alkali with a brilliant greenish-blue coloration.

Example 2

Ten parts of 2-amino-2-methyl-1,3-propanediol is dissolved in 50 parts of water and 10 parts of copper phthalocyanine tetrasulfonylchloride is added thereto with stirring. After stirring the mixture for 10–14 hours at room temperature, the resulting solution is poured into 250 volumes of 10% hydrochloric acid and the precipitated dyestuff filtered off and dried. The greenish-blue powder obtained is valuable as a dye for fibers, particularly silk. It is soluble in water, aqueous ammonia and in dilute aqueous caustic alkali with a brilliant bluish-green coloration.

Example 3

Fifty parts copper phthalocyanine tetrasulfonylchloride in the form of a presscake is added to 100 parts of water in which has been dissolved 10 parts of glucosamine hydrochloride. Sodium carbonate is then added until the reaction mixture is basic and the whole stirred for 20–24 hours at room temperature, after which the dyestuff is isolated in the manner of the preceding examples.

Example 4

Ten parts of aluminum phthalocyanine tetrasulfonylchloride is stirred into 100 parts of water in which is dissolved 100 parts of tris(hydroxymethyl)aminomethane. After stirring at room temperature until dissolution is complete, the mixture is evaporated on a steam bath to approximately one-half its original volume. This residue is then stirred into 200 volumes of 10% hydrochloric acid and the resulting precipitate filtered off and dried. The dyestuff is a brilliant bluish-green powder, soluble in water, aqueous ammonia and dilute caustic alkali.

Example 5

Twenty parts of copper phthalocyanine sulfonylchloride (containing a mixture of the di- and trisulfonylchloride derivatives) is stirred into 100 parts of water containing 20 parts of tris(hydroxymethyl)aminomethane and the mixture stirred overnight at room temperature. The resulting dyestuff is isolated in the manner of the preceding examples. A bright blue powder is obtained which is somewhat less soluble in a dilute aqueous caustic alkali than that of Example 1.

Example 6

Twenty parts of copper phthalocyanine monosulfonylchloride is stirred into 100 parts of water in which has been dissolved 10 parts of tris(hydroxymethyl)aminomethane. The mixture after being stirred for several hours at room temperature is poured into 250 volumes of 10% hydrochloric acid and the precipitated dyestuff filtered and dried. A blue powder is obtained which is less soluble in dilute aqueous caustic alkali than that of Example 6.

As various other embodiments of the invention will occur to those skilled in the art, it is not intended that the scope of the patent be limited except as is required by the prior art and the appended claims.

I claim:

1. A copper phthalocyanine of the benzene series having attached to the phenylene nuclei up to four polyhydroxy sulfonamide groups of the formula:

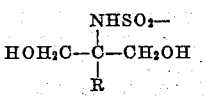

wherein R is a member selected from the group consisting of methyl, ethyl and —CH$_2$OH.

2. A copper phthalocyanine of the benzene series containing attached to the phenylene nuclei up to four tris(hydroxymethyl)methylsulfonamide groups.

3. A copper phthalocyanine of the benzene series containing attached to the phenylene nuclei from two to three tris(hydroxymethyl)methylsulfonamide groups.

RAYMOND LEMUEL MAYHEW.

REFERENCES CITED

The following references are of record in the file of this patent:

UNITED STATES PATENTS

| Number | Name | Date |
| --- | --- | --- |
| 2,300,572 | Hoyer et al. | Nov. 3, 1942 |

FOREIGN PATENTS

| Number | Country | Date |
| --- | --- | --- |
| 520,199 | Great Britain | Apr. 17, 1940 |
| 208,955 | Switzerland | June 1, 1940 |